United States Patent
Bleumer et al.

(10) Patent No.: US 8,682,801 B2
(45) Date of Patent: Mar. 25, 2014

(54) METHOD AND ARRANGEMENT FOR PROVISION OF SECURITY RELEVANT SERVICES VIA A SECURITY MODULE OF A FRANKING MACHINE

(75) Inventors: Gerrit Bleumer, Schildow (DE); Clemens Heinrich, Berlin (DE)

(73) Assignee: Francotyp-Postalia GmbH, Birkenwerder (DE)

( * ) Notice: Subject to any disclaimer, the term of this patent is extended or adjusted under 35 U.S.C. 154(b) by 1973 days.

(21) Appl. No.: 11/642,122

(22) Filed: Dec. 20, 2006

(65) Prior Publication Data

US 2007/0156605 A1  Jul. 5, 2007

(30) Foreign Application Priority Data

Dec. 21, 2005 (DE) .......................... 10 2005 061 686

(51) Int. Cl.
*G06Q 20/00* (2012.01)

(52) U.S. Cl.
USPC ............. 705/60; 705/401; 705/402; 705/405; 705/410; 380/51

(58) Field of Classification Search
None
See application file for complete search history.

(56) References Cited

U.S. PATENT DOCUMENTS

| | | | |
|---|---|---|---|
| 4,812,994 A | 3/1989 | Taylor et al. | |
| 5,655,077 A | 8/1997 | Jones et al. | |
| 5,796,841 A * | 8/1998 | Cordery et al. | 380/55 |
| 6,456,987 B1 | 9/2002 | Pauschinger | |
| 6,785,811 B1 | 8/2004 | Bihlmeyer et al. | |
| 6,868,406 B1 | 3/2005 | Ogg et al. | |
| 2001/0014158 A1 | 8/2001 | Baltzley | |
| 2002/0010640 A1 * | 1/2002 | Dutta et al. | 705/26 |
| 2002/0013773 A1 | 1/2002 | Reisinger | |

FOREIGN PATENT DOCUMENTS

| | | |
|---|---|---|
| EP | 1 486 855 | 12/2004 |
| WO | WO 00/77748 | 12/2000 |

* cited by examiner

*Primary Examiner* — James A Reagan
(74) *Attorney, Agent, or Firm* — Schiff Hardin LLP (57) ABSTRACT

In a method and an arrangement for provision of at least one secured service via a security module of a franking machine for at least one procedure for data processing that is executed in a data processing device that can be connected with the franking machine, the procedure requests a secured first service from the security module in a request step; and the security module provides the first service in a provision step subsequent to the request step. The security module verifies an authorization to request the first service via the procedure in a verification step preceding the provision step.

50 Claims, 3 Drawing Sheets

METHOD AND ARRANGEMENT FOR PROVISION OF SECURITY RELEVANT SERVICES VIA A SECURITY MODULE OF A FRANKING MACHINE

BACKGROUND OF THE INVENTION

1. Field of the Invention

The present invention concerns a method for providing at least one secured service via a security module of a franking machine for at least one procedure for data processing that is executed on a data processing device that can be connected with the franking machine, of the type wherein a request is made in the procedure for the secured service from the security module and the security module provides the secured service following the request. The invention furthermore concerns a corresponding arrangement providing a secured service, a corresponding franking machine, a corresponding data processing device as well as corresponding procedure for data processing.

2. Description of the Prior Art

Franking machines today are normally equipped with a security module containing the postal register, which effects or documents the billing for frankings and executes a portion of the somewhat complex calculations for generation of the respective franking imprint. A number of mail carriers require cryptographic protection of a portion of the imprinted data, so that the security module is frequently designed as a certified cryptography module of somewhat complicated design.

The scope of services of the franking machine is in principle reflected in the scope of services of the security module (not least for reasons of manufacturing costs). A security module with only a lesser scope of services thus is normally required in a franking machine with a lesser scope of services, while in more robust franking machines security modules with a greater scope of services (greater computing capacity, greater storage capacity) are typically used.

In contrast, with regard to the normally required certification of the security modules it is desirable to use optimally few different security modules in order to keep the expenditure for the certification as low as possible.

For example, in order to compensate or, respectively, absorb the negative (with regard to the production costs) effect of the equipment of a franking machine with a complicated security module, U.S. Pat. No. 5,796,841 (Cordery et al.) proposes to use the security module for further secured services such as, for example, the management (generation, verification, recall etc.) of digital certificates. It is proposed to connect the security module of a franking machine with a predetermined PC that then requests the corresponding secured services from the security module and also receives these services insofar as sufficient credit is present in the registers of the security module. It is hereby disadvantageous that the execution of the secured services is connected only to the PC, such that the capacities of the security module (in particular with regard to possible additional security aspects) are not exploited.

SUMMARY OF THE INVENTION

An object of the present invention is to provide a method and arrangement for provision of secured services, a franking machine, a data processing device as well as an application for data processing of the aforementioned type which do not exhibit the aforementioned disadvantages, or only exhibit the aforementioned disadvantages to a lesser degree, and in particular that enable a better utilization of the security-related (and therewith economic) possibilities of the postal security module of the franking machine.

The above object is achieved in accordance with the present invention in a method for providing at least one secured service via a security module of a franking machine for at least one procedure for data processing that is executed in a data processing device associated with the franking machine, wherein the procedure requests a secured service from the security module in a request step, the security module verifies an authorization to request the secured service from the procedure in a verification step, and only upon verifying authorization, the security module provides the secured service in a provision step.

The present invention is based on the recognition that a better utilization of the security-related (and therewith economical) possibilities of the postal security module of a franking machine are enabled when the security module verifies an authorization for requesting the secured service in the first procedure that produces the request before the provision of a secured service. No special connection via which the secured service is requested is required between the franking machine and a specific data processing device. Rather, any authorization criteria can be provided that can be queried by the security module and checked with regard to their fulfillment thereof (by which the authorization can in turn be verified). This has the advantage that, in addition to binding the authorization to a use by one or more data processing devices, binding to people or groups of people as well as procedural applications is also possible. Overall a significant expansion of the utilization of the secured services of the security module is made possible.

The term "secured service" as used herein encompasses any service with which either a generation or output of secured data (for example identifiers, passwords, cryptographic keys, digital certificates etc.) ensues, or a protection of arbitrary data against unauthorized access, unauthorized viewing or undetected manipulation ensues.

The aforementioned procedure can be a postal procedure for data processing, for example the generation of frankings on the PC. The secured service can then, for example, likewise be a postal service, for example the cryptographic protection of postal data to be printed. The secured service can also be, for example, a non-postal service, such as the cryptographic protection or protocolling of non-postal data. The procedure is preferably a non-postal application for data processing and the secured service is preferably a non-postal service. A significant expansion of the utilization of the security-related capacities of the security module thus ensues.

As already mentioned, arbitrary criteria can be established the fulfillment of which is checked for verification of the authorization for requesting the secured service. In the verification step the security module preferably verifies authorization information of the procedure in order to verify the authorization for request for the service. Additionally or alternatively, authorization information of the data processing device and/or of the user of the procedure can be verified. In other words, the authorization is linked singly or in arbitrary combination to the procedure, or to the data processing device which executes the procedure, or to the user of the procedure.

In an authorization step preceding the verification step, the security module advantageously requests from the procedure the authorization information of the procedure and/or of the data processing device and/or of the user of the procedure. Additionally or alternatively, the procedure can automatically transmit to the security module the authorization information of the procedure and/or of the data processing device and/or of the user of the procedure.

In an embodiment of the inventive method the procedure requests that the user of the procedure enter authorization information in the authorization step, the authorization information then being relayed from the procedure directly to the security module. The procedure can then be particularly simply designed in this regard. Additionally or alternatively, using the first aforementioned authorization information as first authorization information, the procedure can generate second authorization information therefrom and relay said second authorization information to the security module For example, it is possible that successful verification of the first authorization information results in the generation of the second authorization information, using which in turn the security module effects the authorization check. The second authorization information can in turn be coupled to the procedure and/or to the data processing device that executes the procedure. Insofar as the procedure and/or the data processing device fulfills corresponding security criteria, the number of the data sets to be stored in the security module for the verification thus can possibly be reduced or at least kept low without simultaneously limiting the group of users of the secured service of the security module.

The transmission of the authorization information to the security module can ensue in any suitable manner. The security level of the transmission preferably conforms to the security level of the first service. The authorization information is preferably transmitted to the security module protected by cryptographic means in order to effectively prevent undetected manipulation or fraudulent utilization of the secured service.

The authorization information itself can already be secured in a suitable manner. In simple-to-operate variants of the invention, however, the procedure secures the authorization information by cryptographic means before the transmission to the security module.

In principle any suitable means and methods can be used for the cryptographic securing. At least one hash value (generated by a hash function) of the authorization information preferably is used for cryptographically securing the authorization information. For example, what is known as a Message Authentication Code (MAC) can be used in which a hash value is generated in a known manner from the authorization information and secret data (for example a secret key). Additionally or alternatively, a digital signature can be used for cryptographic ally securing the authorization information.

The authorization information can be isolated information, for example a random number or arbitrarily encrypted information that is checked in isolation by the security module for verification of the authorization according to a predetermined algorithm (for example by comparison with a secured reference) the provision of the secured service being initiated given a successful check. The respective authorization information can be usable only once; it can thus be a one-time digital token.

As mentioned, binding to the procedure and/or the data processing device and/or the user of the procedure preferably ensues in order to reduce the quantity of the data to be stored for verification in the security module. For this purpose, in an embodiment, in the authorization step, the authorization message (which contains the authorization information and an identification of the procedure and/or of the data processing device and/or of the user of the procedure) is transmitted to the security module. In the security module, the data stored for verification can then be identified in a simple manner using the identification.

For example, a data set with the identification and associated authorization information can be stored in the security module for each authorized procedure and/or each authorized data processing device and/or each authorized user of the procedure. The data set is then identified with the transmitted identification and then is compared with the transmitted authorization information for verification of the authorization.

In the authorization step, the procedure preferably encrypts at least the authorization information of the authorization message. In the verification step the security module then decrypts at least the authorization information of the authorization message, determines (using the identification from the authorization message) an item of authorization information associated with the procedure and/or the data processing device and/or the user of the procedure and compares the stored authorization information with the decrypted authorization information for verification of the authorization. Given the presence of a predetermined relationship between the stored authorization information and the decrypted authorization information, the security module then provides the secured service in the provision step.

The authorization information can be arbitrarily designed. The authorization information preferably includes a password and/or biometrically-detected feature of the user of the procedure. In the case of a password (which is particularly simple to realize), the password is transferred from the user of the procedure to the procedure by manual input or by readout of a memory device. The readout of the memory device can simply occur by the memory being connected with the data processing device that is executing the procedure; for example, a chip card or the like is inserted into a card reader of the data processing device. The readout of the memory device can likewise naturally also ensue without contact. The password can moreover be an arbitrary data string of arbitrary content.

A particularly high level of security is achieved by the use of biometric feature of the user of the procedure. The biometric feature preferably is transferred to the procedure via a biometric sensor that has detected the corresponding biometric feature of the user of the procedure. This biometric sensor is advantageously directly connected with the data processing device that executes the procedure.

The authorization information can be associated both with individual users of the procedure and with a group of users of the procedure, for example the department of a company that uses a franking machine.

In a further embodiment of the inventive method, the security module effects a billing (accounting) for the provision of the secured service in a billing step ensuing during and/or after the provision step. A payment system for utilization of the secured service can thus be implemented in a simple manner. The content of a billing memory of the security module can be is modified in the billing step, the billing memory being a postal billing memory of the security module, in an embodiment. The billing memory can also be an additional memory of the security module.

The secured service can be an arbitrary secured service given which secured operations are executed. The secured service preferably encompasses the encryption and/or the decryption and/or the digital signing and/or the digital certification and/or the digital verification of data that for this purpose are transmitted from the procedure to the security module. These can likewise be further services in connection with the management of digital certificates, for example the retrieval of digital certificates, etc.

The procedure can be, for example, an e-mail program that is executed in the data processing device and the secured service can be, for example, individually retrievable or automatic encryption and decryption of the e-mail traffic that is handled via this e-mail program. Naturally, a different secured service in this context can also be the digital signing and signature verification of the e-mail traffic that is handled via this e-mail program. For example, the procedure can likewise be a data administration program that is executed in the data processing device and the secured service can be, for example, the individually-retrievable or automatic encryption and decryption, or digital signing and signature verification, of the administered data.

Furthermore, the procedure can be a procedure with which management functions can be carried out in a cryptographic hierarchy, for example a certification (known as a Certificate Authority (CA)) in a public key infrastructure. The secured service can then be the generation and/or certification of cryptographic keys.

The procedure can likewise be a procedure for handling auction bids or payment processes or the like and the secured service can then be the generation of a corresponding, cryptographically secured (i.e. encrypted and/or signed and/or certified) digital payment means or payment document. Both prior-payment systems (known as pre-payment systems) and credit systems (known as post-payment systems) can be realized via the security module. Among other things, the inventive verification of the authorization allows the payments to additionally be associated both with individual persons and groups of people, arbitrary organization units or legal personnel.

In further variants of the invention the procedure is the output of a second authorization message (described above) that includes a second identification and/or second authorization information, the second authorization message being provided for input into the (first) procedure and/or a second procedure for data processing. For example, it is herewith possible for a user to administer in the security module a number of identities and associated passwords or the like that the user can then retrieve via the authorization relative to the security module. The second application can be, for example, an online banking program that calls the procedure in the login routine. The secured service can then be the output of the access data required for the login to the online banking program, the access data being securely stored in the security module. Again a corresponding cryptographically-secured output of the access data can also be provided in order to increase the security. In a login routine a further (second) procedure can in turn call the aforementioned procedure, as a first procedure, so the first secured service is then the output of the access data required for the login of the second procedure, the access data likewise being securely stored in the security module and normally differing from the access data of the online banking program.

In further variants of the invention the secured service is the storage of data in a security module that for this purpose are transmitted from the procedure to the security module. This can be, among other things, the cryptographically-secured protocolling and/or archiving of arbitrary events. The protocolling and/or archiving of billing events then can later initiate specific billing processes serving for this purpose and/or be used in this context as a document.

In variants in which the secured service includes the encryption and/or digital signing and/or digital certification of data that are transmitted from the procedure to the security module, a separate cryptographic hierarchy can be developed or used. It is preferable, however, for this ensue using a cryptographic linking of the security module to a postal public key infrastructure such that no separate cryptographic hierarchy must be developed or used.

As noted above, the security module can administer a number of identities and associated second authorization information. In preferred variants of the inventive method, the secured service is the output of a second authorization message that includes a second identification and/or third authorization information, the second authorization message being provided for input into the (first) procedure and/or a second application for data processing, and the generation of the second authorization message ensues dependent on the first procedure and/or the data processing device and/or the user of the first procedure.

The provision of the secured service is advantageously provided for a number of procedures. The security module then contains a number of storage entries (which are respectively associated with respective procedures) in a memory for at least one data processing device and/or at least one user of the data processing device. Each of the storage entries includes at least one second identification and/or third authorization information. That storage entry which is associated with the currently requesting procedure is used for generation of the second authorization message.

The present invention furthermore concerns an arrangement for data processing with a franking machine that includes a postal security module and at least one data processing device that can be connected with the franking machine and is fashioned for execution of at least one procedure for data processing, the procedure being fashioned to request a secured service from the security module and the security module is fashioned to provide the first service subsequent to the request. According to the invention the security module is fashioned for verification (preceding the provision) of an authorization for requesting the secured service via the procedure.

With this arrangement the aforementioned variants and advantages of the inventive method can be realized to an equal degree.

The present invention furthermore concerns a franking machine that exhibits the features described above, a data processing device that exhibits the features described above and a procedure for data processing that is fashioned as the above-described procedure for an inventive arrangement and that exhibits the features described above. The variants and advantages of the inventive method can herewith be realized to an equal degree in each of these further aspects of the invention.

DESCRIPTION OF THE PREFERRED EMBODIMENTS

In the following a preferred embodiment of the inventive arrangement 1 for provision of secured services is described with reference to FIGS. 1 through 5, with which inventive arrangement 1 a preferred variant of the inventive method for provision of secured services is implemented.

Figure 1:
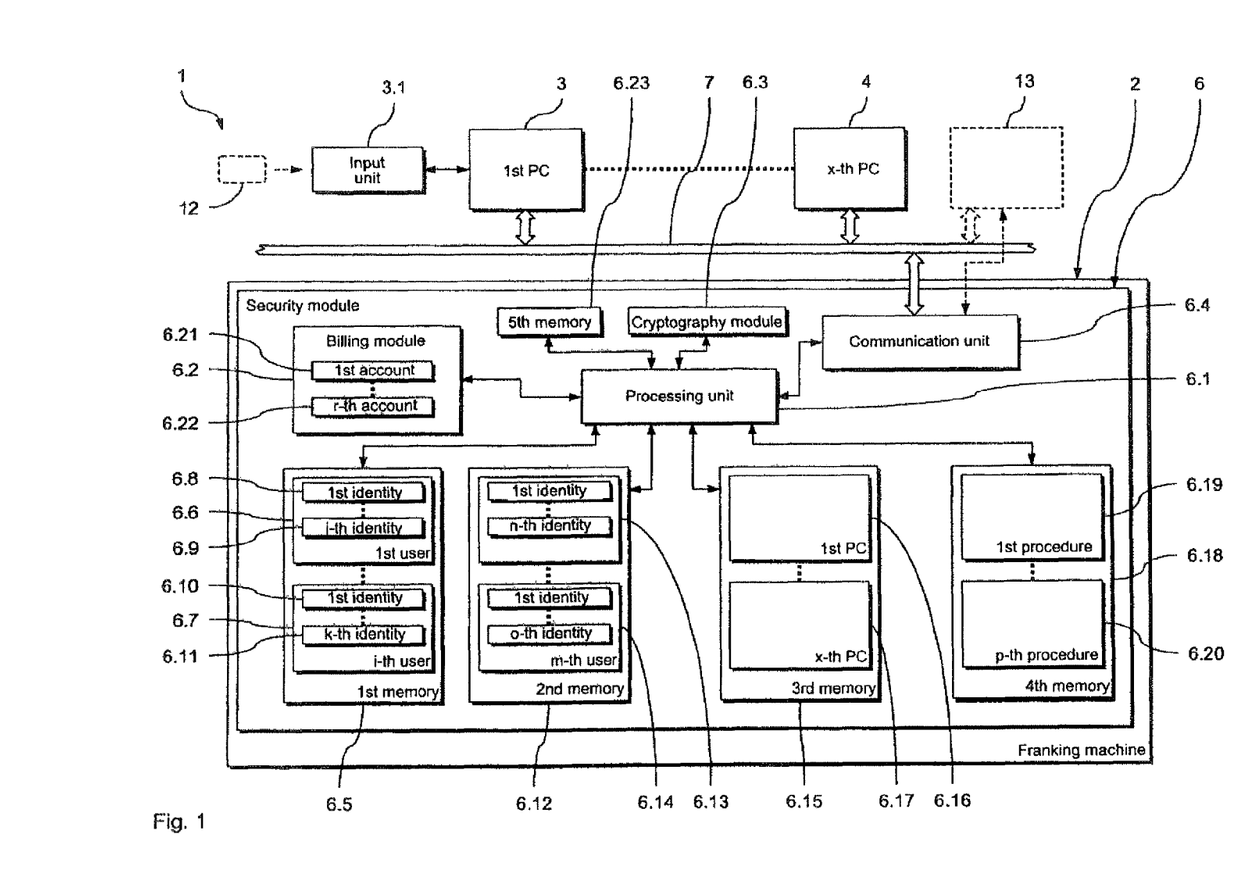
FIG. 1 schematically illustrates a preferred embodiment of the inventive arrangement for provision of secured services, with which embodiment a preferred embodiment of the inventive method for provision of secured services can be implemented.

As can be seen from FIG. 1, the arrangement 1 includes a franking machine 2 and a series of x data processing devices in the form of personal computers (PC) 3, 4. The PCs 3, 4 can respectively be connected with the franking machine 2 via a communication connection, for example a data network 5.

Among other things the franking machine 2 has a security module 6 in addition to the typical components (not shown in FIG. 1) required for franking mail pieces. This security module 6 serves in a typical manner to provide the secured postal services (such as, for example, secured billing of the franking values and the cryptographic securing of specific postal data) required for the franking.

For the secured billing of franking values, in a region physically and logically secured from unauthorized access the security module 6 contains (in addition to a central processing unit 6.1) a billing module 6.2 in the form of a memory device that is connected with the processing unit 6.1 and in which corresponding registers (possibly redundantly present) are provided for storage of the billing data.

For cryptographically securing data, the security module 6 has a cryptography module 6.2 in the form of a memory that is connected with the processing unit 6.1 and in which are stored cryptographic algorithms and parameters that the processing unit 6.1 accesses for implementation of cryptographic operations.

In order to be able to better exploit the capacities of the security module 6 with regard to the provision of secured services, the security module 6 can communicate with the PCs 3, 4 over the data network 5 via a communication unit 6.4. In the shown example this communication unit 6.4 is a component of the security module 6; but in other variants of the invention the communication can ensue via suitable units of the franking machine 2 that do not belong to the security module 6.

As is explained in the following using the PC 3, procedures for data processing can be executed on the respective PC, these procedures requesting from the security module 6 the provision of one or more secured services according to the subsequently-explained inventive method.

Figure 2:
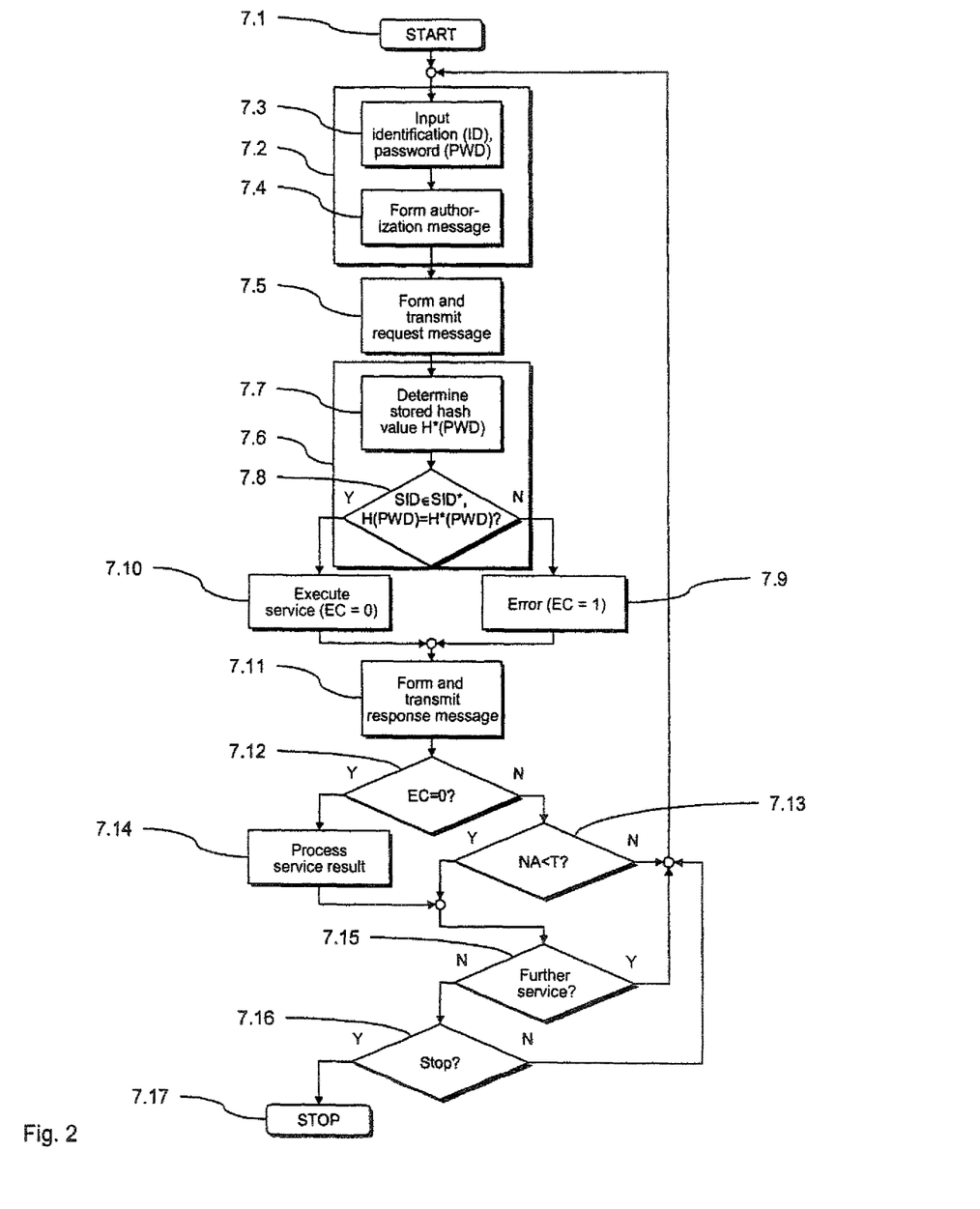
FIG. 2 is a flowchart of a preferred variant of the inventive method for provision of secured services that can be implemented with the arrangement of FIG. 1.

The method workflow is initially started in a step 7.1, for example by calling a procedure for data processing. At a specific point in the workflow of the procedure, for example automatically or upon a specific input of the user of the procedure, in an authorization step 7.2 the procedure requests from the security module 6 the authorization for the implementation of a secured service.

In a first sub-step 7.3 of the authorization step 7.2, the user of the procedure is initially requested to input an identification ID of the user and first authorization information of the user. The authorization information can be arbitrarily designed.

In the present example the authorization information is a password PWD that is input by the user of the first PC into the PC 3 via an input device 3.1. The input device 3.1 can be simple keyboard or another type of input device. In the case of the password being particularly simple to realize, the password is transferred from the user of the procedure to the procedure by manual input or by readout of a memory device. The readout of the memory device can simply occur by connecting the appertaining memory with the input device 3.1. For example, a chip card or the like can be inserted into the input device 3.1 fashioned as a card reader, as is indicated by the dashed outline in FIG. 1. The readout of the memory device can alternatively ensue without contact. The password can moreover be an arbitrary data string of arbitrary content.

In particularly secure variants of the invention that authorization information is a biometrically-detected feature of the user of the procedure. This biometric feature is then preferably transferred to the procedure via an input device 3.1 fashioned as a biometric sensor that has detected the biometric feature of the user of the procedure.

In a second sub-step 7.4 of the request step 7.2, the input identification ID and the password PWD are combined by the procedure into a first authorization message 8. The password PWD is initially converted by a hash function into a second authorization information H(PWD) and encrypted by means of a suitable encryption algorithm. The encrypted second authorization information E(H(PWD)) and the identification ID are then merged into the authorization message 8 (see FIG. 3).

Figure 3:
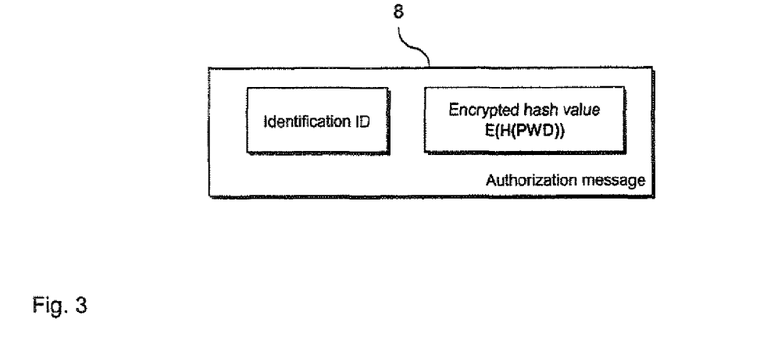
FIG. 3 schematically illustrates of an authorization message that is used in the implementation of the method from FIG. 2.

The use of a hash value thereby results in a reduction of the data set to be transmitted. Additionally, like the encryption it likewise effects a protection of the authorization information from unauthorized viewing and undetected manipulation.

Figure 4:
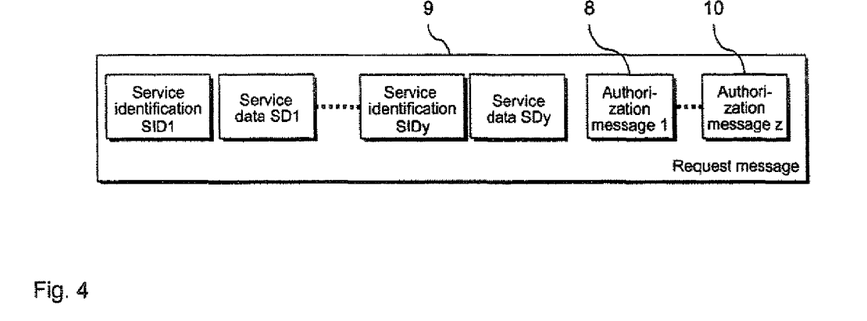
FIG. 4 schematically illustrates a request message that is used in the implementation of the method of FIG. 2.
Figure 5:
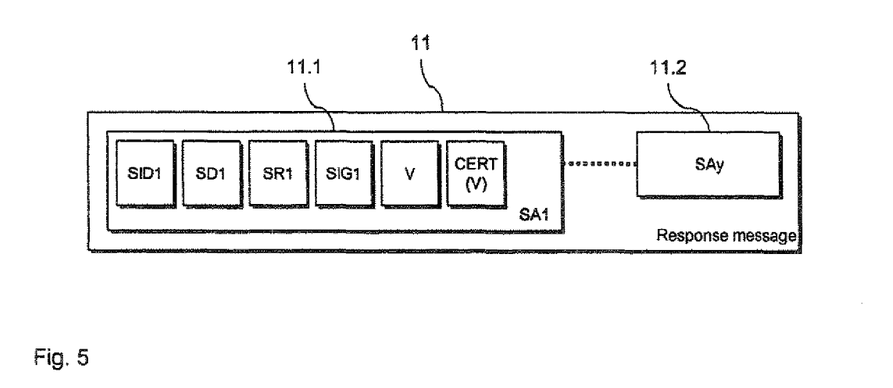
FIG. 5 schematically illustrates a response message that is used in the implementation of the method of FIG. 2.

In a request step 7.5 a request message 9 is then formed and transmitted to the security module 6. In addition to the authorization message 8, the request message 9 includes an identification SID1 of the first service as well as possible service data SD1 that the secured service is to process, or requires for its implementation.

Furthermore, for at least one further requested y-th service the request step 9 can include a further identification SIDy of the y-th service as well as possible service data SDy that the y-th service is to process or requires for its implementation. It is understood that the request message 9 can possibly include one or more further authorization messages 10 insofar as one of the further requested services (for example the y-th service) requires a different authorization.

The further z-th authorization message 10 can be formed like the first authorization message 8. If applicable, the authorization can be linked not only to the user of the procedure also (or instead) to a user group to which the user belongs, or can be linked to the first PC 3, or to the procedure. In this case, the z-th authorization message 10 is generated using an identification of the user group, of the first PC 3, or of the procedure, and corresponding authorization information of the user group or of the first PC 3 or of the procedure. The corresponding identification and authorization information can be input by the user or can be stored in the first PC 3 or the procedure and be automatically read out by the procedure.

In a verification step 7.6 the security module 6 then verifies the authorization for requesting the secured service. For this purpose, in a first sub-step 7.7 of the verification step 7.6 a first memory area 6.6 (associated with the user) of a first memory 6.5 of the security module 6 is initially identified from the transmitted identification ID of the user (see FIG. 1).

In the first memory 6.5 separate memory areas 6.6, 6.7 are respectively defined for a number of i of different users. At least one sub-area 6.8, 6.9 or 6.10, 6.11 is provided in each memory area for the respective user, in which sub-area 6.8, 6.9 or, respectively, 6.10, 6.11 is respectively stored an identity of the user. In the present example each identity includes a user identification associated with the appertaining user and user authorization information associated with this identity, this user authorization information—given use of this identity—supports the authorization of the user for conduct of specific operations or for receipt of specific services. As can be seen from FIG. 1, j identities are stored in the memory area

6.6 for the first user (who, in the present example, is the user of the first PC 3) while k identities are stored in the memory area 6.7 for the i-th user.

Different identities can be stored for different secured services of the security module 6. In the present case, the respective identity includes information SID* as to which secured service or secured services are available or not to the user given a successful authorization. In the simplest case it can also generally be established that all secured services of the security module 6 are available to the user given a successful authorization.

In the first sub-step 7.7 the identity of the user corresponding to this identification ID (and, if applicable, this service) is identified from the transmitted identification ID of the user (and, if applicable, the service identification SID) and the associated stored user authorization information is thus determined. In the present example the stored user authorization information is a hash value of a password H*(PWD) associated with this identity of the first user. It is also possible for any other authorization information to be used in other variants of the invention.

In a second sub-step 7.8 of the verification step 7.6 the stored user authorization information H*(PWD) so determined is then compared in the security module 6 with the transmitted authorization information H(PWD) decrypted again beforehand by the security module 6. Furthermore, using the transmitted service identification SID and the corresponding information SID* it is checked in the stored identity whether the appertaining service is available to the user at all; the transmitted service identification SID is thus, for example, an element or component of the stored information SID* (SID □ SID*).

If a predetermined relationship exists between the transmitted second authorization information H(PWD) and the stored user authorization information H*(PWD) and it was established that the requested service is available to the first user (SID□ SID*), the authorization of the first user to request the second service was thus successfully verified; otherwise the verification fails.

It is understood that the check of the presence of the predetermined relationship between the transmitted second authorization information H(PWD) and the stored user authorization information H*(PWD) can be omitted when, using the transmitted service identification SID, it can already be established that the requested service is not available to the first user.

In the present case the identity between the transmitted second authorization information and the stored user authorization information (i.e. H*(PWD)=H*(PWD)) must be established for the successful verification. However, it is understood that in other variants an arbitrarily different predetermined relationship between the transmitted second authorization information and the stored user authorization information can be required for the successful verification.

If the predetermined relationship between the transmitted second authorization information H(PWD) and the stored user authorization information H*(PWD) does not exist or it was established that the requested service is not available to the first user, in a step 7.9 an error is established and an error code EC=1 is set.

Otherwise in a provision step 7.10 the error code EC=0 is set and the first service is implemented on the basis of the service data SD1 transmitted with the request message.

The same procedure also ensues for the further services possibly requested with the request message. It is should be noted that, analogous to the different identities of individual users in the security module 6, different identities can possibly also be stored in corresponding memories for different user groups as well as for different PCs and different requesting applications.

In a second memory 6.12 a separate memory areas 6.13, 6.14 is thus respectively defined for a number of m different user groups. At least one sub-area is provided in each memory area 6.13, 6.14 for the respective user group. In each sub-area is stored an identification of one user group is stored. Each identity was applied in the framework of a preceding registration or expansion process for the user group. In the present example each identity includes a user group identification associated with the appertaining user group and user group authorization information associated with this identity, the user group authorization information supports the authorization of the user group to effect specific operations or to receive specific services given use of this identity. As can be seen from FIG. 1, n identities are stored in the memory area 6.13 for the first user group while o identities are stored in the memory area 6.14 for the m-th user group.

Separate memory areas 6.16, 6.17 are likewise respectively defined in a third memory 6.15 for the x different PCs 3, 4. At least one sub-area in which an identity of the PC 3, 4 is respectively stored is provided for the respective PC 3, 4 in each memory area 6.16, 6.17. Each identity was applied in the framework of a preceding registration or expansion process for the PC 3, 4. In the present example each identity comprises a PC identification associated with the appertaining PC and PC authorization information associated with this identity, which PC authorization information supports the authorization of the PC to effect specific operations or for receipt of specific services given use of this identity.

Finally, a separate memory area 6.19, 6.20 for the p different applications requesting secured services is respectively defined in a fourth memory 6.18. In each memory area 6.19, 6.20 at least one sub-area in which an identity of the application is respective stored is provided for the respective application. Each identity was applied in the framework of a preceding registration or expansion process for the application. In the present example each identity includes a procedure identification associated with the appertaining procedure and application authorization information associated with this identity/ The procedure authorization information supports the authorization of the procedure to effect specific operations or for receipt of specific services given use of this identity.

If all services to be executed were executed in the step 7.10, in a step 7.11 a response message 11 is generated by the security module 6 and transmitted to the calling application, thus the appertaining PC 3, 4. For each requested first through y-th service this response message comprises a service response SA, i.e. SA1 through SAy or 11.1, 11.2 (see FIG. 5). This service response SA includes the service identification SID, the service data SD, a service result SR, a digital signature SIG(SID, SD, SR) of the security module 6 for SID, SD, SR, the verification key V for the signature SIG(SID, SD, SR) and a digital certificate CERT(V) for the verification key V. Depending on the type of the service, the service result SR includes at least the error code EC for the respective service. If the service should deliver back data to the calling application, the service result SR possibly also includes these data.

After verification of the respective signature SIG(SID, SD, SR) in a step 7.12 the calling application checks whether an error code EC=1 was transmitted for one of the requested services. If this is the case, in a step 7/12 it is checked whether a termination threshold T was already reached for the number of the attempts NA of a request of the service or of the authorization. If this is not the case the workflow jumps back to step 7.2 for the appertaining service.

For the services for which the error code is EC=0, the processing of the service result SR by the calling application ensues in a step 7.14 insofar as the appertaining service should supply data to be processed at all.

After processing of the service result SR, in a step 7.15 it is then checked by the calling application whether a further service should be requested. The same occurs when in the step 7.12 the reaching of the termination threshold T is established, whereby then the request of the service for which the termination threshold T was reached is blocked until the occurrence of predetermined temporal or non-temporal conditions.

If a further service should be requested by the security module 6, the workflow jumps back to step 7.2. Otherwise in a step 7.16 it is checked by the calling application whether the method workflow should be ended. If this is not the case, the workflow jumps back to step 7.2. Otherwise the method workflow is ended in a step 7.17.

In preferred variants of the inventive method, it is provided that the security module 6 effects a billing for the provision of the first service in a billing step ensuing during and/or after the provision step 7.10. A payment system for the usage of the appertaining service can hereby be implemented in a simple manner. The content of the billing module 6.2 of the security module 6 is modified in the billing step. The billing module 6.2 can include separate areas for the postal registers and the registers for the billing of the services requested via a PC 3,4; in the simplest case, however, the billing can also ensue exclusively using the postal registers.

In the billing module r different accounts 6.21, 6.22 can be provided for the billing that are associated with different users, different user groups, different PCs and/or different requesting applications. In the simplest case the billing for the service then ensues to the account of the user whose authorization was verified for the service request.

The secured service can be an arbitrary secured service in which secured operations are executed. The first service preferably includes the encryption and/or the decryption and/or the digital signing and/or the digital certification and/or the digital verification of data that for this are transmitted from the procedure to the security module 6. There can likewise be further services in connection with the management of digital certificates, for example the recall of digital certificates, etc.

The procedure can be, for example, an e-mail program that is executed in the PC 3 and the secured service can be, for example, the individually callable or automatic encryption and decryption of the e-mail traffic that is handled via this e-mail program. The procedure can be, for example, a data administration program which is executed on the PC 3 and the first service can be, for example, the individually callable or automatic encryption and decryption, or digital signing and signature verification of the administered data.

Furthermore the procedure can be an application with which management functions can be carried out in a cryptographic hierarchy, for example a certification instance (what is known as the certificate authority (CA)) in a public key infrastructure. The second service can then be the generation and/or certification of cryptographic keys that ensues at the request by the procedure.

The procedure can likewise be a procedure for handling auction bids or payment processes or the like and the first service can then be the generation (ensuing in step 7.10) of a corresponding, cryptographically-secured (i.e. encrypted and/or signed and/or certified) digital payment means or payment document that is then transferred n a step 7.11 and further processed in a step 7.14.

Both prior payment systems (known as pre-payment systems) and credit systems (known as post-payment systems) can thereby be realized by the security module 6. As mentioned, by the inventive verification of the authorization the payments can moreover additionally be associated both with individual persons and with groups of people, arbitrary organization units or legal personnel.

In further variants of the invention the secured service includes the output of a second authorization message in the step 7.11 that includes a second identification and/or third authorization information, the second authorization message is provided for input in the (first) procedure and/or a second procedure for data processing.

For example, it is herewith possible to administer for one user a number of identities with the associated passwords or the like in the security module 6, which identities the user can then retrieve via the authorization with regard to the security module 6. The second procedure can be, for example, an online banking program which calls the procedure in the login routine. The secured service can then be the output of the access data required for the login of the online banking program, which access data are securely stored as one of the identities in the security module 6 (for example in the memory area 6.6 associated with the first user). Here as well a corresponding, cryptographically-secured output of the access data can also be provided in order to increase the security.

A further second procedure can in turn call the afore procedure (as a first procedure) in a login routine, the secured service then being the output of the access data required in 7.11 for the login of the further second application, which access data are likewise securely stored in the security module 6 as another identity and normally differ from the access data of the online banking program, thus the identity for the online banking program.

In further variants of the invention the secured service includes the storage in a fifth memory 6.23 of the security module 6 of data that are transmitted from the procedure to the security module 6. Among other things, these can hereby be the possible corresponding, cryptographically-secured protocolling and/or archiving of any events. The protocolling and/or archiving of billing-relevant events can then later serve to initiate specific billing process and/or are to be used there as a document.

In variants in which the secured service includes the encryption and/or digital signing and/or digital certification of data that for this are transmitted from the procedure to the security module 6, a separate cryptographic hierarchy can be developed or used. Preferably, however, this ensues using a cryptographic linking of the security module 6 to a postal public key infrastructure so that no separate cryptographic hierarchy must be developed or, respectively, used.

As already mentioned above, it can be provided that the security module 6 can administer a number of identities and associated second authorization information. In preferred variants of the inventive method the secured service includes the output of a second authorization message that includes a second identification and/or third authorization information, whereby the second authorization message being provided for input in the procedure and/or a second application for data processing.

In this case the security module 6 effects the generation of the second authorization message dependent on the procedure and/or the data processing device and/or the user of the procedure, which is communicated to the security module 6 with the service data SD or the authorization message 8, 10.

The secured service can be called by a number of procedures. The security module 6 then has a number of identities (which are respectively associated with one of the procedures) in the first memory 6.5 for at least one user and/or in the second memory 6.12 for at least one PC 3, 4. For generation of the second authorization message that memory entry (thus the identity) is then used which is associated with the current requesting procedure.

In the present example the PCs are connected via the data network 7 (for example a LAN, WAN, Internet etc.) with the security module 6 of the franking machine 2. In other variants of the invention a direct point-to-point connection of the security module 6 with a PC can also be provided as this is indicated in FIG. 1 by the dashed outline 13. As is likewise indicated, this PC 13 can then possibly be connected with other PCs via a data network (LAN, WAN, Internet etc.) and these thus enable the access to the security module 6.

The memories of the security module 6 described in the preceding can all or in part be fashioned as separate memory modules and merely as individual memory areas of a single memory module.

The present invention was described in the preceding using examples with PCs, but it is understood that it can also be used in connection with arbitrary other data processing devices.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for providing at least one secured service via a security module of a franking machine for at least one procedure for data processing that is executed in a data processing device associated with the franking machine, comprising the steps of:
   in a request step, requesting, from the procedure, a secured service from the security module;
   in a verification step, verifying, in said security module, a non-monetary-based authorization, selected from the group consisting of authorization information linked to said procedure, authorization information linked to said data processing device, and authorization information linked to a user of said procedure, to request said secured service from said procedure; and
   in a provision step that follows said verification step only if said security module verifies said authorization, providing said secured service from the security module to the procedure.

2. A method as claimed in claim 1 comprising executing a non-postal procedure for data processing as said procedure in said data processing device, and requesting a non-postal service as said secured service.

3. A method as claimed in claim 1 comprising, in an authorization step in said security module preceding said verification step:
   in said security module, generating a request for said authorization information and transmitting said request for said authorization information from the security module to said procedure; and
   in response to said request for said authorization information, transmitting said authorization information from said procedure to said security module.

4. A method as claimed in claim 3 comprising, in said authorization step:
   said procedure generating a further request at said data processing device requesting a user of said procedure to enter said authorization information into said data processing device; and
   said procedure causes said authorization information to be transmitted from said data processing device to said security module.

5. A method as claimed in claim 3 comprising transmitting said authorization information as cryptographically secured information to said security module.

6. A method as claimed in claim 5 comprising, in said procedure, cryptographically securing said authorization information before transmitting said authorization information to said security module.

7. A method as claimed in claim 6 comprising cryptographically securing said authorization information in said procedure by a security technique selected from the group consisting of generating at least one hash value with a hash function for said authorization information, encrypting said authorization information, and adding a digital signature to said authorization information.

8. A method as claimed in claim 3 comprising, in said authorization step, transmitting said authorization information to said security module from said data processing device in an authorization message that comprises said authorization information and an identification of at least one of said procedure, said data processing device, and said user of said procedure.

9. A method as claimed in claim 8 comprising:
   in said procedure, encrypting at least said authorization information of said authorization message in said authorization step; and
   in said verification step in said security module, decrypting at least said authorization information of said authorization message, determining, using the decrypted authorization information, stored authorization information associated with at least one of said procedure, said data processing device and said user of said procedure, comparing the stored authorization information with the decrypted authorization information for verification of the authorization, and providing said secured service in said provision step upon, as a result of said comparing, identifying a predetermined relationship between said stored authorization information and the decrypted authorization information.

10. A method as claimed in claim 8 wherein said authorization message is a first authorization message and said authorization information is first authorization information and said identification is a first identification, and wherein the step of providing said secured service comprises providing a second authorization message comprising at least one of second authorization information and a second identification, for input into at least one of said procedure and a second procedure executed in said data processing device.

11. A method as claimed in claim 10 comprising generating said second authorization message dependent on an at least one of said procedure, said data processing device, and a user of said procedure.

12. A method as claimed in claim 8 wherein said authorization message is a first authorization message and said authorization information is first authorization information, and comprising:
   making said secured service available to a plurality of procedures executed in said data processing device;
   in a memory in said security module, storing a plurality of memory entries respectively uniquely associated with said plurality of procedures, each memory entry comprising at least a second identification; and
   wherein providing said secured service comprises generating a second authorization message in said security module using the second identification information uniquely associated with the procedure, among said plurality of procedures that generated said request for said secured service.

13. A method as claimed in claim 8 wherein said authorization message is a first authorization message and said authorization information is first authorization information, and comprising:
    making said secured service available to a plurality of procedures respective executed in a plurality of different data processing devices;
    in a memory in said security module, storing a plurality of memory entries respectively uniquely associated with said plurality of procedures, each memory entry comprising at least a second identification; and
    wherein providing said secured service comprises generating a second authorization message in said security module using the second identification information unique associated with the procedure, among said plurality of procedures that generated said request for said secured service.

14. A method as claimed in claim 3 wherein said security module requests authorization information selected from the group consisting of authorization information comprising a password and authorization information comprising a biometrically-detected feature of a user of said procedure.

15. A method as claimed in claim 3 comprising, from said security module, requesting from said procedure authorization information associated with at least one user of said procedure.

16. A method as claimed in claim 3 comprising, in said authorization step:
    said procedure requesting that a user of said procedure enter first authorization information into said data processing device;
    in said procedure, generating second authorization information using said first authorization information; and
    transmitting said second authorization information, as said authorization information, from said data processing device to said security module.

17. A method as claimed in claim 1 wherein said authorization information comprises a password, and comprising transferring said password from a user of said procedure to said procedure in said data processing device by an input selected from the group consisting of manual input into said data processing device and readout of a memory device by said data processing device.

18. A method as claimed in claim 1 wherein said authorization information comprises a biometrically-detected feature of the user of said procedure, and comprising detecting said biometrically-detected feature of the user of the procedure with a biometric sensor at said data processing device and transferring said biometrically-detected feature to said procedure from said biometric sensor.

19. A method as claimed in claim 1 comprising including authorization information in said request from said procedure to said security module in said request step, said authorization information being selected from the group consisting of authorization information of the procedure, authorization information of the data processing device, and authorization information of the user of the procedure.

20. A method as claimed in claim 1 comprising:
    implementing a billing step at a time selected from the group consisting of during and after said provision step, and in said billing step, generating a monetary charge for billing for providing said secured service.

21. A method as claimed in claim 20 wherein said security module comprises a postal billing memory, and comprising modifying a content of said postal billing memory by said security module in said billing step corresponding to said charge.

22. A method as claimed in claim 1 comprising providing, as said secured service, a secured service selected from the group consisting of encrypting data transmitted from said procedure to said security module, decrypting data transmitted from said procedure to said security module, digitally signing data transmitted from said procedure to said security module, providing a digital certification of data transmitted from said procedure to said security module, and digitally verifying data transmitted from said procedure to said security module.

23. A method as claimed in claim 1 comprising providing, as said secured service, a secured service selected from the group consisting of encryption of data transmitted from said procedure to said security module, digitally signing data transmitted from said procedure to said security module, and digital certification of data transmitted from said procedure to said security module, and wherein providing said secured service comprises cryptographically linking said security module to a postal public key infrastructure.

24. A method as claimed in claim 1 wherein providing said secured service comprises storing data in said security module that have been transmitted from said procedure to said security module.

25. A method as claimed in claim 1 comprising providing said at least one security relevant service for a plurality of procedures for data processing and, in a plurality of request steps, requesting, in each of said plurality of procedures, said at least one security relevant service from said security module and, in a verification step for each of said plurality of request steps, verifying said authorization to request said security relevant service in said security module for each of said plurality of procedures.

26. An arrangement for providing at least one secured service comprising:
    a data processing device configured to execute at least one procedure for data processing;
    a franking machine in communication with said data processing device, said franking machine, comprising a security module configured to provide at least one secured service to said procedure;
    said data processing device being configured to, in a request step, request from the procedure, a secured service from the security module;
    said security module being configured to, in a verification step, verify a non-monetary-based authorization to request said secured service from said procedure;
    said security device being configured to, in said verification step, verify said authorization to request said security relevant service by verifying authorization information selected from the group consisting of authorization information linked to said procedure, authorization information linked to said data processing device, and authorization information linked to a user of said procedure; and
    said security module also being configured to execute a provision step following said verification step only if said security module verifies said authorization, to provide said secured service from the security module to the procedure.

27. An arrangement as claimed in claim 26 wherein said data processing device is configured to executing a non-postal procedure for data processing as said procedure and to request a non-postal service as said secured service.

28. An arrangement as claimed in claim 26 wherein said security device is configured to, in an authorization step preceding said verification step, generate a request for said authorization information and transmitting said request for said authorization information from the security module to said procedure, and in response to said request for said authorization information, transmit said authorization information from said procedure to said security module.

29. An arrangement as claimed in claim 28 wherein said data processing device is configured to, in said procedure, generate a further request requesting a user of said procedure to enter said authorization information into said data processing device, and in said procedure, cause said authorization information to be transmitted from said data processing device to said security module.

30. An arrangement as claimed in claim 28 wherein said data processing device is configured to transmit said authorization information as cryptographically secured information to said security module.

31. An arrangement as claimed in claim 30 wherein said data processing device is configured to, in said procedure, cryptographically secure said authorization information before transmitting said authorization information to said security module.

32. An arrangement as claimed in claim 31 wherein said data processing device is configured to cryptographically secure said authorization information in said procedure by a security technique selected from the group consisting of generating at least one hash value with a hash function for said authorization information, encrypting said authorization information, and adding a digital signature to said authorization information.

33. An arrangement as claimed in claim 28 wherein said data processing device is configured to, in said authorization step, transmit said authorization information to said security module in an authorization message that comprises said authorization information and an identification of at least one of said procedure, said data processing device, and said user of said procedure.

34. An arrangement as claimed in claim 33 wherein said data processing device is configured to, in said procedure, encrypt at least said authorization information of said authorization message in said authorization step, and wherein said security device is configured to, in said verification step, decrypt at least said authorization information of said authorization message, determine, using the decrypted authorization information, stored authorization information associated with at least one of said procedure, said data processing device and said user of said procedure, compare the stored authorization information with the decrypted authorization information for verification of the authorization, and provide said secured service in said provision step upon, as a result of said comparing, identifying a predetermined relationship between said stored authorization information and the decrypted authorization information.

35. An arrangement as claimed in claim 33 wherein said authorization message is a first authorization message and said authorization information is first authorization information and said identification is a first identification, and wherein said data processing device is configured to provide a second authorization message comprising at least one of second authorization information and a second identification, for input into at least one of said procedure and a second procedure executed in said data processing device.

36. An arrangement as claimed in claim 33 wherein said authorization message is a first authorization message and said authorization information is first authorization information, and wherein said security device is configured to make said secured service available to a plurality of procedures executed in said data processing device, and, in a memory in said security module, store a plurality of memory entries respectively uniquely associated with said plurality of procedures, each memory entry comprising at least a second identification, and provide said secured service by generating a second authorization message in said security module using the second identification information uniquely associated with the procedure, among said plurality of procedures, that generated said request for said secured service.

37. An arrangement as claimed in claim 33 comprising a plurality of different data processing devices, including said data processing device, and wherein said authorization message is a first authorization message and said authorization information is first authorization information, and wherein said security device is configured to make said secured service available to a plurality of procedures respective executed said plurality of different data processing devices and, in a memory in said security module, store a plurality of memory entries respectively uniquely associated with said plurality of procedures, each memory entry comprising at least a second identification, and provide said secured service by generating a second authorization message in said security module using the second identification information uniquely associated with the procedure, among said plurality of procedures, that generated said request for said secured service.

38. An arrangement as claimed in claim 28 wherein said security device is configured to request authorization information selected from the group consisting of authorization information comprising a password and authorization information comprising a biometrically-detected feature of a user of said procedure.

39. An arrangement as claimed in claim 28 wherein said security device is configured to request from said procedure authorization information associated with at least one user of said procedure.

40. An arrangement as claimed in claim 26 wherein said authorization information comprises a password, and wherein said data processing device comprises an input unit allowing transfer of said password from a user of said procedure to said procedure in said data processing device by an input selected from the group consisting of manual input into said data processing device and readout of a memory device by said data processing device.

41. An arrangement as claimed in claim 26 wherein said authorization information comprises a biometrically-detected feature of the user of said procedure, and comprising a biometric sensor at said data processing device that detects said biometrically-detected feature of the user of the procedure and transfers said biometrically-detected feature to said procedure from said biometric sensor.

42. An arrangement as claimed in claim 28 wherein said data processing device is configured to, in said authorization step, request in said procedure that a user of said procedure enter first authorization information into said data processing device, and in said procedure, generate second authorization information using said first authorization information, and transmit said second authorization information, as said authorization information, to said security module.

43. An arrangement as claimed in claim 26 wherein said data processing device is configured to include authorization information in said request from said procedure to said security module in said request step, and to select said authorization information from the group consisting of authorization information of the procedure, authorization information of the data processing device, and authorization information of the user of the procedure.

44. An arrangement as claimed in claim 26 wherein said security device is configured to implement a billing step at a time selected from the group consisting of during and after said provision step, and in said billing step, said security device being configured to generate a monetary charge for billing for providing said secured service.

45. An arrangement as claimed in claim 44 wherein said security module comprises a postal billing memory, and wherein said security device is configured to modify a content of said postal billing memory in said billing step corresponding to said charge.

46. An arrangement as claimed in claim 26 wherein said security device is configured to provide, as said secured service, a secured service selected from the group consisting of encrypting data transmitted from said procedure to said security module, decrypting data transmitted from said procedure to said security module, digitally signing data transmitted from said procedure to said security module, providing a digital certification of data transmitted from said procedure to said security module, and digitally verifying data transmitted from said procedure to said security module.

47. An arrangement as claimed in claim 26 wherein said security device is configured to provide, as said secured service, a secured service selected from the group consisting of encryption of data transmitted from said procedure to said security module, digitally signing data transmitted from said procedure to said security module, and digital certification of data transmitted from said procedure to said security module, and wherein, when providing said secured service, wherein said security device is configured to cryptographically link itself to a postal public key infrastructure.

48. An arrangement as claimed in claim 26 wherein said data processing device is configured to generate said second authorization message dependent on an at least one of said procedure, said data processing device, and a user of said procedure.

49. An arrangement as claimed in claim 26 wherein said security device is configured to provide said secured service by storing data in said security module that have been transmitted from said procedure to said security module.

50. An arrangement as claimed in claim 26 wherein said security module is configured to provide said at least one security relevant service for a plurality of procedures for data processing, and wherein said data processing device is configured to, in a plurality of request steps, request, in each of said plurality of procedures, said at least one security relevant service from said security module, and wherein said security module is configured to, in a verification step for each of said plurality of request steps, verify said authorization to request said security relevant service for each of said plurality of procedures.

* * * * *